United States Patent [19]

Kato et al.

[11] Patent Number: 4,895,751
[45] Date of Patent: Jan. 23, 1990

[54] WATERPROOF, WATER-VAPOR-PERMEABLE FABRIC CONSTRUCTION

[76] Inventors: Tatsu Kato, 3-15-18, Sakura, Setagayaku, Tokyo 156; Takashi Imai, 831-2 Kinugasa, Wake-cho, Wake-gun, Okayama-ken 709-04, both of Japan

[21] Appl. No.: 105,093

[22] Filed: Oct. 6, 1987

[30] Foreign Application Priority Data

Oct. 8, 1986 [JP] Japan .................... 61-153701[U]

[51] Int. Cl.⁴ .............................................. B32B 7/00
[52] U.S. Cl. ................... 428/245; 428/265; 428/267; 428/287; 428/421; 428/422; 428/913
[58] Field of Search ............ 428/245, 287, 421, 422, 428/913, 308.4, 315.5; 2/167; 418/265, 267

[56] References Cited

U.S. PATENT DOCUMENTS

| | | | |
|---|---|---|---|
| 3,663,266 | 5/1972 | Dye | 468/315.5 |
| 4,187,390 | 2/1980 | Gore | 428/315.5 |
| 4,194,041 | 3/1980 | Gore et al. | 428/315.5 |
| 4,385,093 | 5/1983 | Hubio | 428/421 |
| 4,469,744 | 9/1984 | Grot et al. | 428/421 |
| 4,483,900 | 11/1984 | Goldfarb | 428/421 |
| 4,518,650 | 5/1985 | Grot et al. | 428/421 |
| 4,524,102 | 6/1985 | Hostettler | 428/315.5 |
| 4,526,828 | 7/1985 | Fogt et al. | 428/902 |
| 4,547,423 | 10/1985 | Kojima et al. | 428/315.5 |
| 4,598,011 | 7/1986 | Bowman | 428/421 |
| 4,636,424 | 1/1987 | Amemiya et al. | 428/315.5 |
| 4,731,283 | 3/1988 | Sakane et al. | 428/421 |

Primary Examiner—James J. Bell
Attorney, Agent, or Firm—Mortenson & Uebler

[57] ABSTRACT

A waterproof, water-vapor-permeable fabric construction is provided comprising a laminate of a water-permeable material such as a polyester fabric bonded to a waterproof, water-vapor-permeable film such as a film of expanded, porous polytetrafluoroethylene, wherein at least a part of the laminate is molded so that it has a permanent curved shape. This fabric construction is useful in various articles of clothing such as hats.

9 Claims, 1 Drawing Sheet

WATERPROOF, WATER-VAPOR-PERMEABLE FABRIC CONSTRUCTION

BACKGROUND OF THE INVENTION

The present invention concerns a waterproof, water-vapor-permeable fabric. The object of the present invention is to provide a material which makes it possible to manufacture, both easily and reliably, hats and other accessories and articles of apparel, so that the articles are obtained as products with insured waterproof and moisture-permeable characteristics.

The present invention concerns a material which makes it possible to manufacture hats, shoes, gloves, socks, underwear and other articles of clothing, etc., as products with insured waterproof and moisture-permeable characteristics.

If articles such as hats (and other accessories) and underwear (and other types of clothing) can be produced as articles which are waterproof and moisture permeable, it becomes possible to obtain articles of clothing which keep the body from becoming wet in the rain, and which, at the same time, allow moisture or water vapor arising from perspiration to pass through the material so that this moisture is appropriately dispersed. Such clothing is desirable in that it allows comfortable wear in both of the abovementioned situations.

One method of obtaining such waterproof and moisture-permeable characteristics is as follows: i.e., by rolling or drawing a polytetrafluoroethylene film, it is possible to form a spiderweb-form fibrilized structure with micropores which average approximately 0.2 microns in size, as disclosed in U.S. Pat. No. 3,953,566. Furthermore, this structure is a stable structure in which the microfibrils are stretched between micronodes. The small size of the spaces between the fibrils acts in conjunction with the water-repelling properties of the resin itself so that the material has reliable waterproof characteristics under ordinary pressures. Furthermore, moisture can effectively pass through the aforementioned micropores. Similar structures are being studied and developed using resins other than the abovementioned fluoroethylene resin.

If the aforementioned accessories or articles of clothing are formed using such a waterproof, water-vapor-permeable film or fabric as a material, it is possible to obtain products which are waterproof and water vapor permeable, and such products have very wide practical application.

However, the abovementioned waterproof, water-vapor-permeable material must be formed as a flat sheet-form material, both due to considerations involved in industrial mass production and in order to obtain uniform characteristics. In cases where the aforementioned three-dimensional accessories or articles of clothing are formed from such a flat sheet-form material, it is necessary to cut a considerable number of material parts, and to combine these parts by sewing in order to form a three-dimensional configuration. In the case of configurations which must be especially smooth, it is necessary to use a large number of the aforementioned material parts, and the number of individual sewing processes is correspondingly increased, so that considerable labor must be expended.

Furthermore, in the case of such sewn articles, the painstakingly achieved waterproof structure is destroyed by the needle punctures created in the sewing process, so that the resulting articles are not waterproof. Accordingly, a hole-plugging process is required in order to plug these sewing holes (needle punctures). Thus, in addition to the aforementioned cutting and sewing, a hole-plugging process is required, which increases the labor expended and drives costs up. Furthermore, even if waterproof characteristics are obtained in the areas subjected to the aforementioned hole-plugging process, the moisture permeability of these areas is usually impeded as a result. At the very least, the waterproof characteristics or water-vapor-permeability (or other properties such as the feel of the material) in the areas subjected to the aforementioned hole-plugging treatment are damaged or altered by the hole-plugging agent used.

SUMMARY OF THE INVENTION

A waterproof, water-vapor-permeable fabric construction is provided comprising a laminate of a water-permeable material bonded to a waterproof, water-vapor-permeable film, at least a part of the laminate being molded so that it has a permanent curved shape. The waterproof, water-vapor-permeable film preferably is a film of expanded, porous polytetrafluoroethylene and the water-permeable material is preferably a fabric of nylon or polyester. The construction may be in the shape of a hat, a sock, a cap, a girdle, a glove or other similar construction.

DETAILED DESCRIPTION OF THE INVENTION AND PREFERRED EMBODIMENTS WITH REFERENCE TO THE DRAWINGS

A waterproof, water-vapor-permeable fabric construction is provided comprising a laminate of a water-permeable material such as a polyester fabric bonded to a waterproof, water-vapor-permeable film such as a film of expanded, porous polytetrafluoroethylene, wherein at least a part of the laminate is molded so that it has a permanent curved shape. This fabric construction is useful in various articles of clothing such as hats.

The present invention provides a waterproof, moisture-permeable fabric which is characterized by the fact that all or part of a fabric formed by laminating a water-permeable material with a waterproof, water-vapor-permeable film, such as a porous, expanded polytetrafluoroethylene film, is molded so that it has a curved shape.

As a result of the abovementioned waterproof, water-vapor-permeable film, waterproof characteristics and moisture permeability are obtained in the fabric construction as a whole. Furthermore, the abovementioned water-permeable material, which consists of an ordinary woven fabric, etc., protects the aforementioned waterproof, moisture-permeable film, and endows the film with formability.

By molding the abovementioned fabric into a curved shape, a curved surface which is suitable for comfortable wear is formed. At the same time, the number of unit material parts required in order to obtain the desired accessory or article of clothing is greatly reduced, and sewing and hole-plugging processes are either rendered unnecessary or greatly reduced in extent.

Concrete working configurations of the present invention will be described below with reference to the accompanying drawings.

Figure 1:
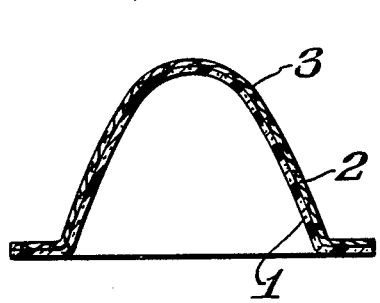
FIG. 1 is a cross-sectional view of the fabric construction of the invention in the shape of a hat.

As is shown in FIG. 1, a universally-known water-permeable material 2 made of nylon or polyester fibers, etc., is laminated with a porous polytetrafluoroethylene film 1 which has been formed so that the film construction is waterproof water-vapor-permeable. The resulting laminated fabric is three-dimensionally molded so that it has a permanent curved surface 3. In addition to woven fabrics, foam-coated fabrics can be appropriately used for the aforementioned water-permeable material 2. Furthermore, the aforementioned porous polytetrafluoroethylene film 1 may be replaced by a waterproof, water-vapor-permeable film made of some other synthetic resin.

Figure 2:
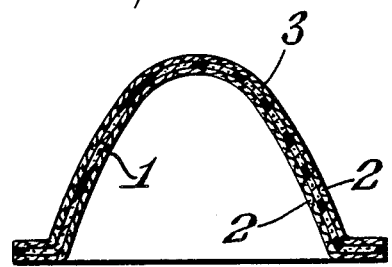
FIG. 2 is a cross-sectional view of an alternate embodiment of a hat-shaped construction according to the invention.

FIG. 2 shows another working configuration of the present invention. In this configuration, the aforementioned water-permeable material 2 is laminated not only on the outside surface in the aforementioned curved form 3, but also on the inside surface in said form. In this case as well, it is clear that the overall fabric is waterproof and water-vapor-permeable. Furthermore, the formability into the curved form 3 is better when the aforementioned material 2 is laminated on both sides in the form as shown in FIG. 2 than it is when said material 2 is used on only one side in the form as shown in FIG. 1. Moreover, this causes little interference with the waterproof and moisture-permeable characteristics of the fabric when the fabric is worn as described above. Furthermore, in cases where respective materials 2 are laminated on both sides of the porous film 1 as shown in FIG. 2, it is desirable that the outer material be superior in terms of strength. Moreover, a colorful material may be used for this outer material. On the other hand, a material with a smooth feel which will not be soiled by perspiration, etc., is used for the inner material.

Figure 3:
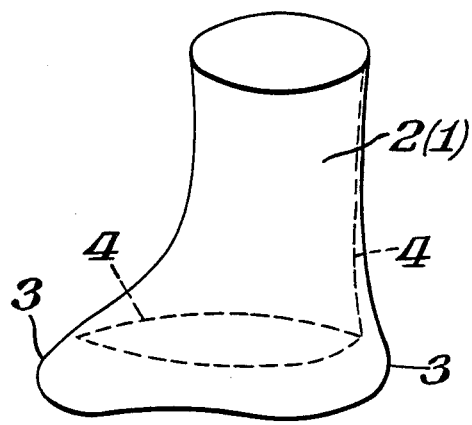
FIGS. 3–6 show embodiments of the invention in the forms of a sock, a cap, a girdle and a glove, respectively.
Figure 5:
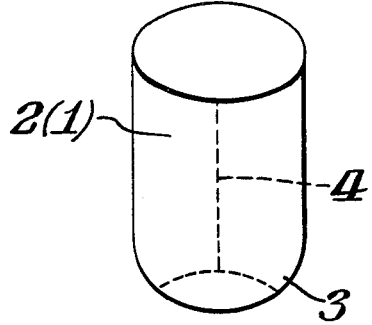
Figure 4:
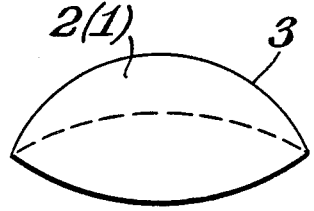
Figure 6:
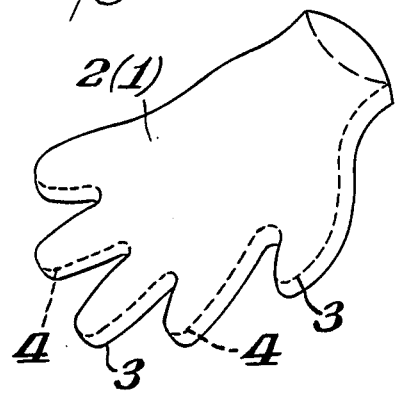

The present invention is not limited to hat-form articles as shown in FIGS. 1 and 2. Various products such as those shown in FIGS. 3-6 may be obtained. For example, FIG. 3 shows a sock-form article formed by a material with curved areas 3, 3. FIG. 4 shows a cup-shaped, cap-form article. FIG. 5 shows a girdle-form article with a narrow opening at one end. FIG. 6 shows a glove-form article obtained by means of two pieces of fabric with respective curved peripheries. The article shown in FIG. 4 is made of a single piece of material which is formed in a curved shape. The articles shown in remaining figures have joints such as sewn seams 4, and use an appropriate multiple number of pieces of material. Any universally-known common woven fabric may be used for the aforementioned water-permeable material 2. However, thermoplastic fabrics made of synthetic fibers such as nylon fibers, polyester fibers or acrylic fibers, etc., are especially desirable. Such fibers absorb little water and can be effectively formed into an integral unit with the aforementioned porous film 1 in order to protect the film. Furthermore, such fibers are also superior in terms of resistance to soiling. In cases where the curved form is hemispherical or semicircular (as in a hat), the fabric can easily be heated in a concave-convex mold. In some cases, parts in which the periphery is substantially curved (in part or as a whole, as in hat brims) can also be formed as a whole. However, in cases where formation of an integral unit using a single piece of material is difficult, two or more pieces of material may be separately formed into curved shapes, and these pieces of material may be joined to form the finished product. In cases where a multiple number of pieces of material are thus joined, some of the disadvantages of conventional methods remain to a slight degree. Nevertheless, it is at least possible to reduce the number of pieces of material used and to achieve a great simplification of the sewing and hole-plugging processes involved.

EXAMPLE 1

A material 2 obtained by weaving a 30 denier polyester yarn was laminated with an expanded, porous polytetrafluoroethylene film 1 which had a mean pore size of 0.2 microns and a thickness of 30 microns. The resulting fabric was interposed between upper and lower dies (with curved surfaces) heated to approximately 220° C. and was pressed for approximately 30 seconds to obtain a desired hat form. The water resistance (resistance to water pressure) of the hat thus obtained was measured and was found to be greater than 4 kg/cm$^2$. Thus, it was clear that this hat had a sufficient waterproof performance for ordinary uses. Furthermore, the moisture permeability was measured by the method described in JIS L-1099B and was found to be 25,000 g/m$^2$-24 hr. It was thus confirmed that this hat was a comfortable, waterproof, moisture-permeable hat.

EXAMPLE 2

The same polyester yarn material 2 used in Example 1 was laminated on the inside and outside surfaces of the same drawn porous polytetrafluoroethylene film 1 used in Example 1, as shown in FIG. 2. The resulting fabric was formed by heating and pressing under the same conditions as in Example 1. The resulting formed article had a water resistance exceeding 4 kg/cm$^2$ and had sufficient waterproofness at ordinary pressures. Furthermore, this formed article had a moisture permeability of 18,000 g/m$^2$-24 hr. Thus, it was confirmed that this hat had a comfortable water vapor permeability and that absolutely no water would pass through the hat when exposed to rain. Furthermore, in this case, a similar formed article was successfully obtained by pressing a polyester woven fabric at 200° C.

EXAMPLE 3

A fabric obtained by laminating a material 2, formed by weaving a polyester yarn, on both sides of a drawn porous polytetrafluoroethylene film 1 as in Example 2 was formed into an article consisting of a tube-form part with an expanded part at the lower end as shown in FIG. 3. A product was obtained by joining these parts by sewn seams 4.

In other words, a sock-form article can be obtained using only two pieces of material by forming an integral unit in which a lower part is joined with an upper part in the aforementioned curved area 3. Thus, the labor required in the case of conventional articles of this type, which required at least five or six separate pieces of material in order to obtain such a product, is greatly reduced in the case of the present invention, and a smooth product can be obtained.

As was described above, the present invention makes it possible to manufacture low-cost hats, gloves and other accessories or articles of clothing by means of a simple process using a waterproof, water-vapor-permeable fabric without damaging the characteristics of said fabric. Accordingly, the present invention has great industrial merit.

While the invention has been disclosed herein in connection with certain embodiments and detailed descriptions, it will be clear to one skilled in the art that modifications or variations of such details cann be made without deviating from the gist of this invention, and such modifications or variations are considered to be within the scope of the claims hereinbelow.

What is claimed is:

1. A waterproof, water-vapor-permeable fabric construction comprising a three-dimensional laminate of a water-permeable material bonded to a waterproof, water-vapor-permeable film, at least a part of said laminate being molded so that it has a permanent three-dimensional curved shape.

2. The construction of claim 1 wherein said waterproof, water-vapor-permeable film if a film of expanded, porous polytetrafluoroethylene.

3. The construction of claim 1 wherein said water-permeable material is a fabric of polyester.

4. The construction of claim 1 wherein said water-permeable material is a fabric of nylon.

5. The construction of claim 1 in the shape of a hat.

6. The construction of claim 1 in the shape of a sock.

7. The construction of claim 1 in the shape of a cap.

8. The construction of claim 1 in the shape of a girdle.

9. The construction of claim 1 in the shape of a glove.

* * * * *